United States Patent
Jeong et al.

(10) Patent No.: US 8,732,535 B2
(45) Date of Patent: May 20, 2014

(54) METHOD OF DETECTION OF ERRONEOUS MEMORY USAGE

(75) Inventors: Jae-Hoon Jeong, Yongin-si (KR);
Ekaterina Anatolievna Gorelkina, Moscow (RU); Hyun-Joo Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 13/441,275

(22) Filed: Apr. 6, 2012

(65) Prior Publication Data

US 2012/0260136 A1    Oct. 11, 2012

(30) Foreign Application Priority Data

Apr. 7, 2011  (RU) ................................. 2011113394

(51) Int. Cl.
*G06F 11/00* (2006.01)

(52) U.S. Cl.
USPC ....................................................... 714/47.1

(58) Field of Classification Search
USPC .......................................................... 714/47
See application file for complete search history.

(56) References Cited

U.S. PATENT DOCUMENTS

| | | | |
|---|---|---|---|
| 5,909,580 A | 6/1999 | Crelier et al. | |
| 7,774,761 B2 * | 8/2010 | Vohra | 717/130 |
| 2005/0144410 A1 | 6/2005 | Swafford et al. | |
| 2007/0136547 A1 | 6/2007 | Swafford | |
| 2008/0052468 A1 | 2/2008 | Speirs et al. | |

* cited by examiner

*Primary Examiner* — Bryce Bonzo
(74) *Attorney, Agent, or Firm* — Jefferson IP Law, LLP

(57) ABSTRACT

A method of detection of erroneous memory usage is provided. The method includes starting a computer and executing a program and a monitoring tool to collect calls to a memory during execution of the program, detecting a call to the memory using the monitoring tool, extracting lines of code which request access to a memory address via the call to the memory, detecting a set of variables to which access is granted via the call to the memory, extracting, after execution of the predetermined program, the set of variables for each of the lines of code, detecting erroneous memory usage by matching the extracted lines of code with the set of variables, and determining the call as erroneous upon access being granted to the memory corresponding to the set of variables during execution of the predetermined program when access is not possible during the execution of the program.

3 Claims, 2 Drawing Sheets

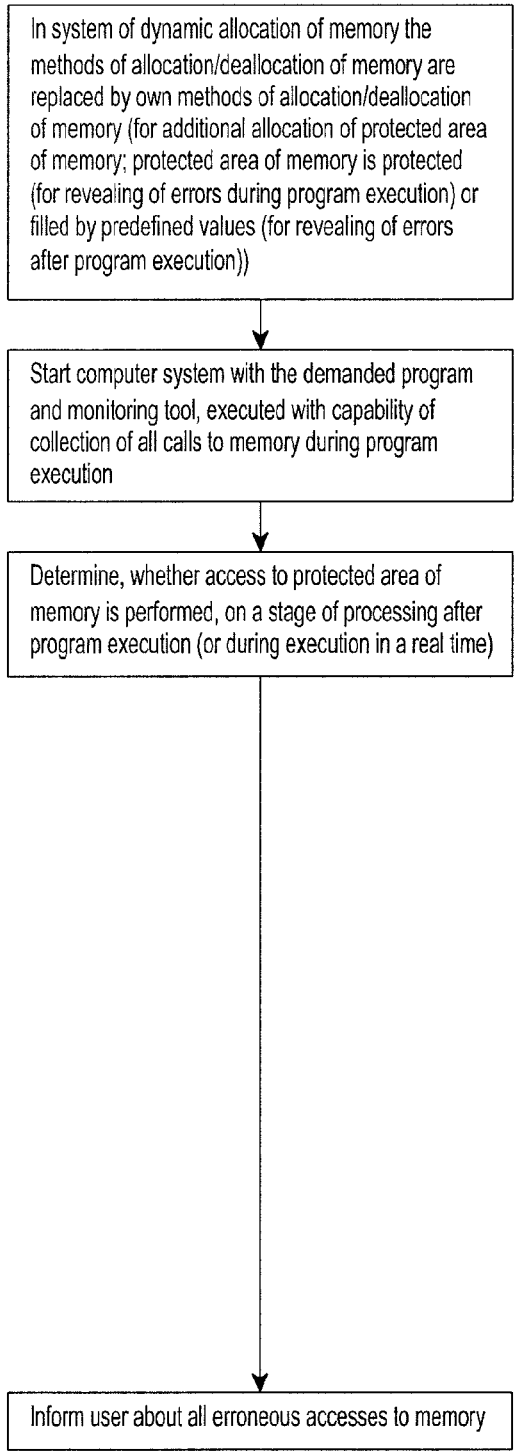
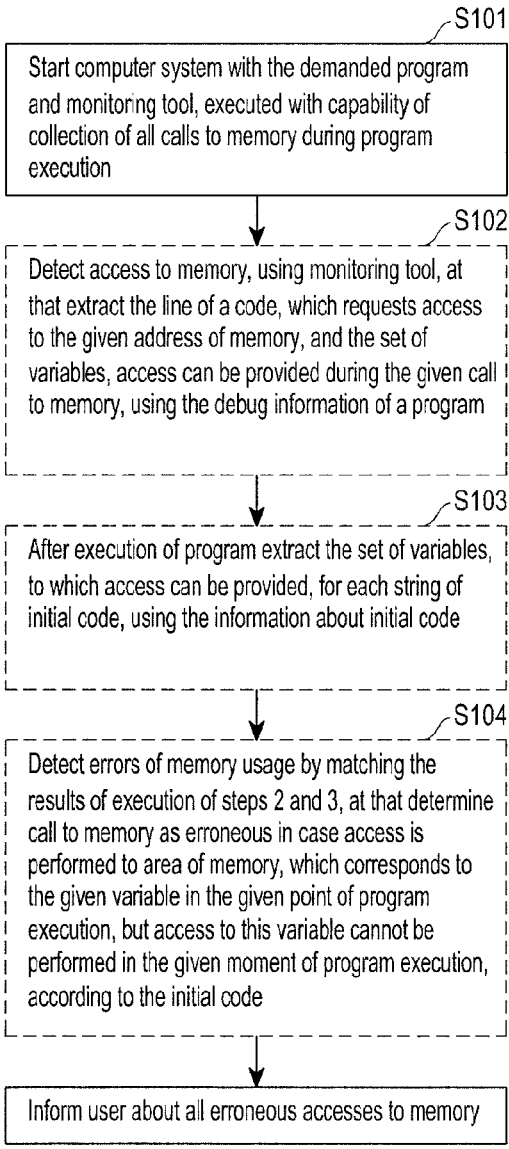
FIG.1A
(RELATED ART)
FIG.1B

METHOD OF DETECTION OF ERRONEOUS MEMORY USAGE

PRIORITY

This application claims the benefit under 35 U.S.C. §119 (a) of a Russian patent application filed on Apr. 7, 2011 in the Russian Intellectual Property Office and assigned Serial No. 2011113394, the entire disclosure of which is hereby incorporated by reference.

BACKGROUND OF THE INVENTION

1. Field of the Invention

The present invention relates to a computer system and a method of detection of erroneous memory usage. More particularly, the present invention relates to methods of detection of erroneous memory usage in order to provide automatic detection of typical memory errors, such as a buffer overflow, including a buffer overflow inside a structure, a case when two allocated objects are rerecorded on top of one another, and unauthorized access, in computer programs.

2. Description of the Related Art

Recently, as computer systems have become increasingly complex, and provide wider variety functions using more processing, memory, and computer resources, program debugging has become more costly. In order to reduce efforts of software or computer program developers in program debugging, several approaches and methods have been developed. These methods can be divided on two main categories: static analysis methods and dynamic analysis methods. The methods of the respective categories may be used for detection of a wide set of problems. However, the methods of the respective categories have drawbacks which make the methods disadvantageous for detecting incorrect memory usage, which is a widespread problem that is difficult to detect.

The dynamic analysis methods are based on the information arriving or being processed during execution of a program. The dynamic analysis methods make it possible to detect incorrect memory calls which are out of an allocated memory range. Nevertheless, these methods are disadvantageous in a case having an error wherein two allocated objects are recorded one over one another, or there is an overflow of the buffer inside an allocated structure or part of a memory.

The static analysis methods are based on research or analysis of an initial code. However, the static analysis methods may not detect all problems associated with memory because of difficulty of achieving an accurate or useful analysis of the data flow for large computer systems. In other words, due to the increasing size of computer programs, the amount of time and resources used for static analysis also increases, thereby making the static analysis methods disadvantageous.

A method of detection of an incorrect allocation of memory having zero length in real time is known, as disclosed in U.S. Patent Application No. 2007/0136547, the entire disclosure of which is hereby incorporated by reference, and which describes a method of debugging of a standard program which incorrectly performs allocation of memory of zero length. However, the drawback of the noted method is that it may only detect allocation of memory of zero length, and thus the more complex memory errors, of memory access, such as overflow of the buffer and unauthorized memory access, may not be detected by the noted method.

A method of detection of overflow errors of memory during program execution is disclosed in U.S. Patent Application No. 2008/0052468, the entire disclosure of which is hereby incorporated by reference. Detection of such errors may occur due to attempted use of protected memory, which is not accessible because of the circumstances associated with the overflow of memory, such as access to non-allocated memory, and access to a stack of memory which is out of a stack area, or other similar circumstances. However, the noted method does not detect an incorrect memory call to memory which is allocated, for example, in a case when the object is rerecorded in memory during call to another object.

Another method of detecting incorrect usage of memory that is dynamically allocated is described in U.S. Patent Application No. 2005/0144410, the entire disclosure of which is hereby incorporated by reference, and which is based on data or a program stored in a tail-end of an allocated memory area, which has a specified value, and determining of the specified value during execution of the program or after the termination of the execution of the program. However, the noted method has a narrow field of application. More particularly, the noted method detects erroneous usage of the memory, which is allocated dynamically, and thus, segments of a memory stack and data cannot be checked by the noted method. Additionally, the noted method may detect memory errors in a predefined area of the memory, but may not detect memory errors in memory outside of the predefined area, such as when an object is rerecorded during a call to another object.

SUMMARY OF THE INVENTION

Aspects of the present invention are to address at least the above-mentioned problems and/or disadvantages and to provide at least the advantages described below. Accordingly, an aspect of the present invention provides a method of detection of erroneous memory usage in order to provide automatic detection of typical memory errors, such as a buffer overflow, including a buffer overflow inside a structure, a case when two allocated objects are rerecorded on top of one another, and unauthorized access, in computer programs.

According to an aspect of the present invention, there is provided a method of detection of erroneous memory usage. The method includes starting a computer system and executing a predetermined program and a monitoring tool in order to collect all calls to a memory of the computer system during execution of the predetermined program, detecting a call to the memory by using the monitoring tool, extracting, using debug information of the predetermined program, lines of code, from among initial code of the predetermined program, which requests an access to a memory address via the call to the memory, detecting a set of variables to which access is granted via the call to the memory, extracting, after execution of the predetermined program, the set of variables to which access is granted for each of the lines of code according to information on the initial code, detecting the erroneous memory usage by matching the extracted lines of code using the debug information with the set of variable to which access is granted, and determining the call to the memory as erroneous upon access being granted to the memory address corresponding to the set of variables at a certain time during execution of the predetermined program when access to a variable from among the set of variables is not possible at the certain time during the execution of the program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1A is a flowchart illustrating execution of a method of detection of erroneous memory usage according to the related art;

FIG. 1B is a flowchart illustrating execution of a method of detection of erroneous memory usage according to an exemplary embodiment of the present invention.

Throughout the drawings, it should be noted that like reference numbers are used to depict the same or similar elements, features, and structures.

DETAILED DESCRIPTION OF THE EXEMPLARY EMBODIMENTS

Figure 2:
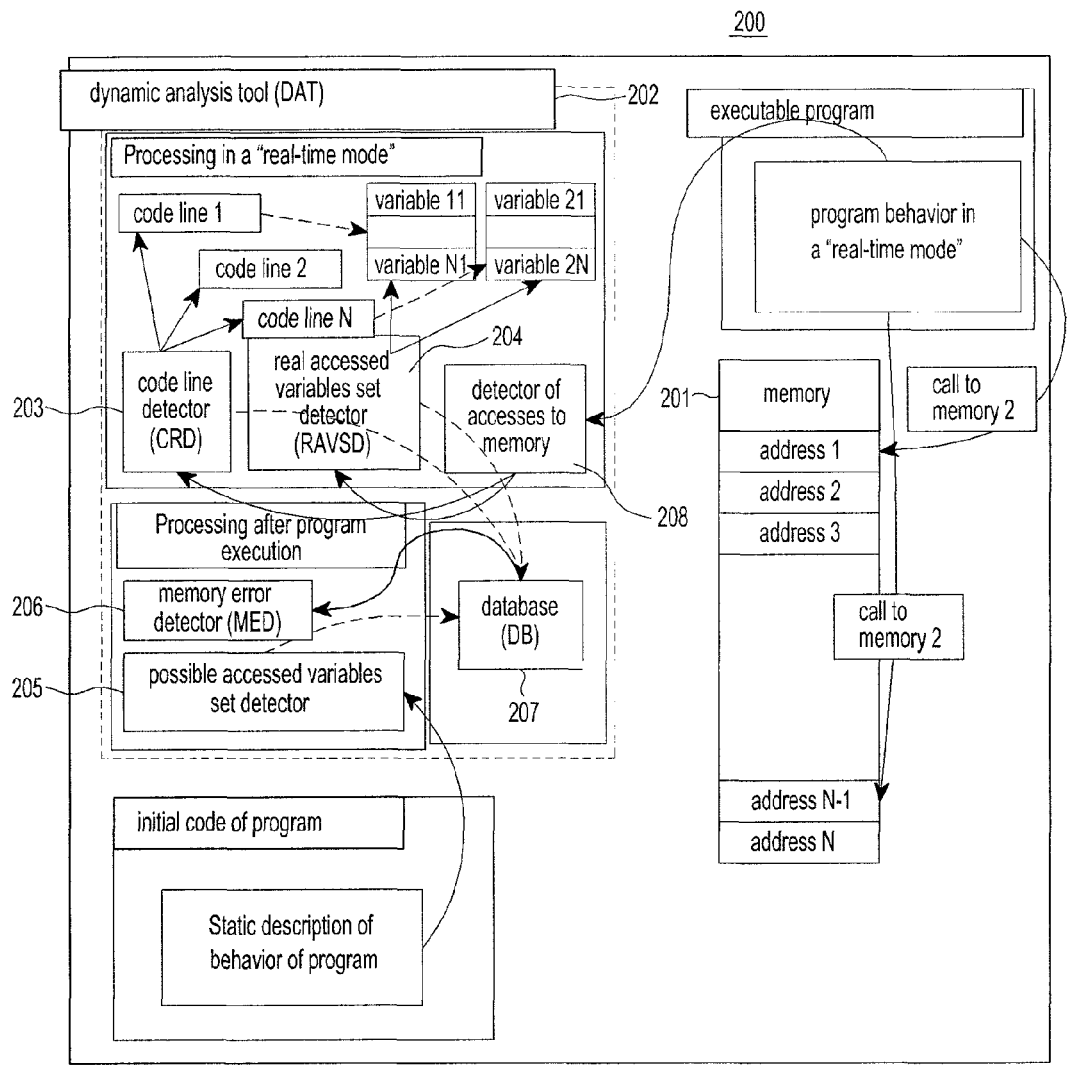
FIG. 2 illustrates a scheme of execution of the method of detection of erroneous memory usage in the computer system according to an exemplary embodiment of the invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The exemplary embodiments of the present invention provide a method of detection of erroneous memory usage through application of a monitoring tool. The monitoring tool provides dynamic analysis for detection of calls to memory, debug information of a program for determination of errors and to which variable access is provided for a current call to memory, and information on initial code of the program for determination of errors and for which variables access is possible at a given line of the initial code.

In other words, the present exemplary embodiments of the present invention provide joint application or usage of a static analysis method and a dynamic analysis method.

FIG. 1A is a flowchart illustrating execution of a method of detection of erroneous memory usage according to the related art. FIG. 1B is a flowchart illustrating execution of a method of detection of erroneous memory usage according to an exemplary embodiment of the present invention.

Referring to FIG. 1B, in step 101, a computer system is powered on or started so as to execute a predetermined program and the monitoring tool in order to collect all calls to a memory during execution of the predetermined program.

Next, in step 102, a call to the memory is detected by the monitoring tool, and then a line of code may be extracted by using the debug information of the predetermined program, wherein the line of code requests access to a memory address using the call to the memory. Additionally, a set of variables corresponding to the call to the memory are extracted, wherein access to the set of variables may be performed via the call to the memory.

In step 103, after execution of the predetermined program, the set of variables is extracted for each line of the initial code using the information of the initial code. Next, in step 104, memory usage errors are detected by matching of results of the execution of steps 102 and 103 in order to determine whether the call to memory is erroneous. The call to memory may be erroneous in a case where access to an area of the memory corresponding to the call to memory has been performed and a given variable, from among the set of variables, at a predetermined point of time during the execution of the predetermined program and access to the given variable is not possible at the predetermined point of time during the execution of the predetermined program, according to an initial code.

As such, the present exemplary embodiment allows for detecting of incorrect memory usage in order to detect problems and errors such as overflow of the buffer, including a case when two allocated objects are recorded one over one another or in a case when there is an overflow of the buffer in the allocated structure. As a result of the execution of the exemplary embodiment disclosed in FIG. 1B, an initial line of code from among the initial code is received when there is an incorrect memory access. Using such information, that is the initial line of code associated with the error or incorrect memory access, a developer may be made aware of a reason for the incorrect memory access or the error of the computer system, which is connected with the memory usage.

FIG. 2 illustrates a scheme of execution of the method of detection of erroneous memory usage in the computer system according to an exemplary embodiment of the invention.

Referring to FIG. 2, a computer system 200 includes a memory 201 and the monitoring tool executed as a Dynamic Analysis Tool (DAT) 202. The DAT 202 includes a Code Line Detector (CLD) 203 for detecting a line of a code, and a Real Accessed Variables Set Detector (RASVD) 204 in order to detect requested variables. The DAT 202 also includes a Possible Accessed Variables Set Detector (SAVSD) 205, a Memory Error Detector (MED) 206, a Database (DB) 207, and a memory access detector 208.

The computer system 200 is turned on or started with the predetermined program and the monitoring tool, which is the DAT 202, being activated. After starting the computer system 200, information corresponding to addresses of requested memory, from among the memory 201, is gathered during execution of the predetermined program by the DAT 202. In order to gather such information, the DAT 202, dynamic instrumentation is applied by the DAT 202 in order to allow interception of all calls to the memory 201 during execution of the predetermined program. According to the related art, instructions or commands for calls to the memory are replaced by a handler of a given event in order to detect calls to the memory by approaches of the dynamic instrumentation. The method disclosed according to an exemplary embodiment of the present invention may be applied to a variety of processing techniques of dynamic instrumentation so as to allow intercepting of all accesses to the memory.

The CLD 203 is requested upon detection of an access to the memory 201. The CLD 203 extracts a line of code that requests access to the memory 201 via a call to the memory 201 at a predetermined memory address by using the debug information of the program. The CLD 203 processes the line of code which provides the call to the memory 201 during execution of the predetermined program in order to save the line of code in the DB 207. Accordingly, all lines of code which provide access to memory 201, i.e., lines of code that request access to the memory 201 via a call to the memory 201, during program execution, are saved in the database 207.

In addition, the RAVSD 204 is called when an access to the memory 201 via a call to the memory 201 is detected. The RASVD 204 extracts a set of variables to which access can be provided during the call to the memory 201 by using the debug information. The RASVD 204 also performs processing so that the line of code, which provides access to the memory 201 is matched to a link to a set of variables and saved in the DB 207. In a case of access to the memory 201, which has not been allocated, the list of available variables is empty.

Furthermore, at a stage of processing after execution of the predetermined program, the PAVSD 205 obtains data or information from an output of the CLD 203 after an input of all lines of code of the initial code which provide access to the memory 201 during the execution of the predetermined program. For each line of the initial code, the PAVSD 205 extracts a set of variables to which access may be provided based on the data or the information on the lines of code of the initial code. The PAVSD 205 performs analysis of a data flow for extraction of this information, such as an imposing analysis. Results of the processing by the PAVSD 205 is a set of variables, access to which may be provided according to the lines of code of the initial code. The result of processing by the PAVSD 205 is matched to the link to the line of code of the initial code which provides access to the memory 201 via an output of the CLD 203, and the result of the processing is stored in the DB 207.

The DAT 202 calls the MED 206, processes each line of code which provides access to or calls the memory 201 and compares two sets of variables, a first set of variables being from an output of the RAVSD 204 and a second set of variables being from an output of the PAVSD 205. If there is a variable, from among the set of variables output from the RAVSD 204, which is present on an output of the RAVSD 204, but is not present on an output of the PAVSD 205, then the MED 206 provides a notification corresponding to the error.

The methods of the present exemplary embodiments provide accurate detection of errors of memory based on both the information received during execution of a program, and the information on an initial code of the program.

While the invention has been shown and described with reference to certain exemplary embodiments thereof, it will be understood by those skilled in the art that various changes in form and details may be made therein without departing from the spirit and scope and spirit of the invention as defined by the appended claims and their equivalents.

What is claimed is:

1. A method of detection of erroneous memory usage, the method comprising:
    starting a computer system and executing a predetermined program and a monitoring tool in order to collect all calls to a memory of the computer system during execution of the predetermined program;
    detecting a call to the memory by using the monitoring tool;
    extracting, using debug information of the predetermined program, lines of code, from among initial code of the predetermined program, which requests an access to a memory address via the call to the memory;
    detecting a set of variables to which access is granted via the call to the memory;
    extracting, after execution of the predetermined program, the set of variables to which access is granted for each of the lines of code according to information on the initial code;
    detecting the erroneous memory usage by matching the extracted lines of code using the debug information with the set of variable to which access is granted; and
    determining the call to the memory as erroneous upon access being granted to the memory address corresponding to the set of variables at a certain time during execution of the predetermined program when access to a variable from among the set of variables is not possible at the certain time during the execution of the program.

2. The method of claim 1, wherein the extracting of the lines of code comprises saving the extracted lines of code in a database of the memory.

3. The method of claim 1, wherein the extracting of the set of variables comprises saving the extracted set of variables in a database of the memory.

* * * * *